United States Patent [19]

Oguchi et al.

[11] 4,452,634
[45] Jun. 5, 1984

[54] METHOD OF STIRRING MOLTEN METAL AND REFRACTORY CYLINDER FOR THE PURPOSE

[75] Inventors: Yukio Oguchi; Norio Sumida; Tetsuya Fujii; Toshihiko Emi, all of Chiba; Toshio Fujimura; Arata Ueda, both of Kurashiki, all of Japan

[73] Assignee: Kawasaki Steel Corporation, Kobe, Japan

[21] Appl. No.: 437,514

[22] Filed: Oct. 29, 1982

[30] Foreign Application Priority Data

| Jul. 20, 1982 [JP] | Japan | 57-126284 |
| Jul. 20, 1982 [JP] | Japan | 57-126285 |
| Jul. 20, 1982 [JP] | Japan | 57-126286 |
| Jul. 20, 1982 [JP] | Japan | 57-126287 |

[51] Int. Cl.$^3$ .............................................. C22B 9/00
[52] U.S. Cl. ........................................ 75/93 R; 75/49
[58] Field of Search ............................... 75/93 R, 49

[56] References Cited

U.S. PATENT DOCUMENTS

| 2,967,768 | 1/1961 | Harders | 75/93 R |
| 3,468,525 | 9/1969 | Kawawa | 75/49 |
| 3,508,743 | 4/1970 | Erdelyi | 75/93 R |

*Primary Examiner*—Peter D. Rosenberg
*Attorney, Agent, or Firm*—Balogh, Osann, Kramer, Dvorak, Genova & Traub

[57] ABSTRACT

A method of stirring molten metal by repeatedly sucking and rapidly discharging part of the molten metal into and out of a refractory cylinder having a lower opening end immersed in the molten metal in a ladle, comprises operating the stirring under a condition that an inner diameter (d) of the refractory cylinder is less than 1,000 mm, a relation between the inner diameter (d, mm) of the refractory cylinder and weight (W, ton) of the molten metal in the ladle is $d/W^{0.5} > 30$, and an immersed depth of the refractory cylinder is within 200-700 mm. A pressurized gas for discharging the sucked molten metal out of the cylinder is introduced thereinto in an inclined direction relative to a vertical line against a point on an opposite inner wall of the cylinder at least 500 mm above the maximum suction level of the molten metal in the cylinder.

A refractory cylinder operated in the above manner according to the invention comprises a flange connection between an uppermost and an intermediate cylinder parts of the cylinder at a location higher than the maximum suction height of the molten metal and a further flange connection between the intermediate cylinder part and a lowermost cylinder part. The refractory cylinder comprises at its immersed end a flow restricting opening to obtain more strong stirring the molten metal.

9 Claims, 15 Drawing Figures

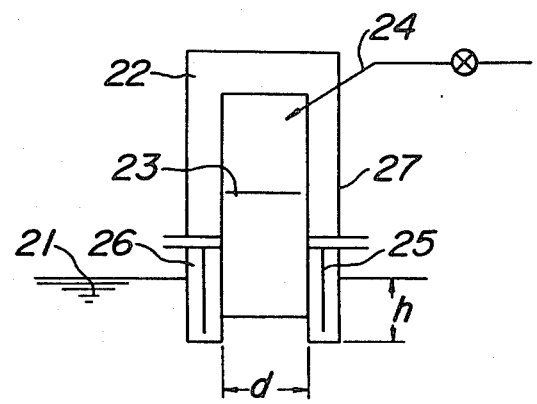
FIG_2
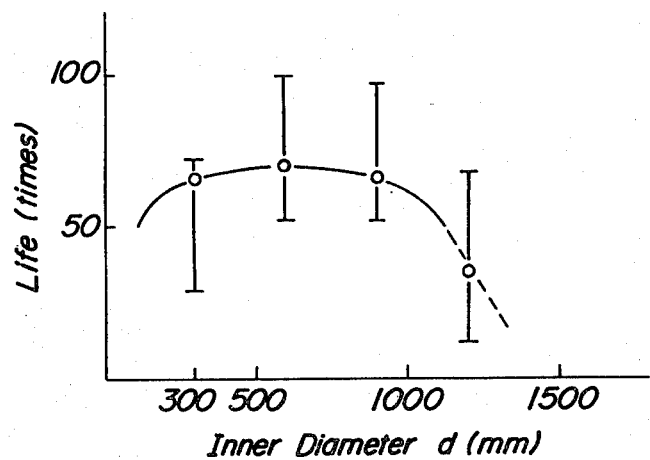
FIG_3

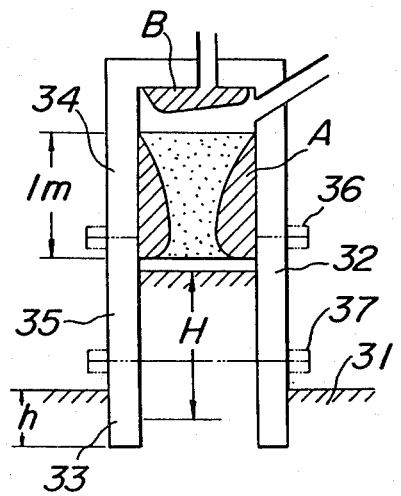
FIG_8
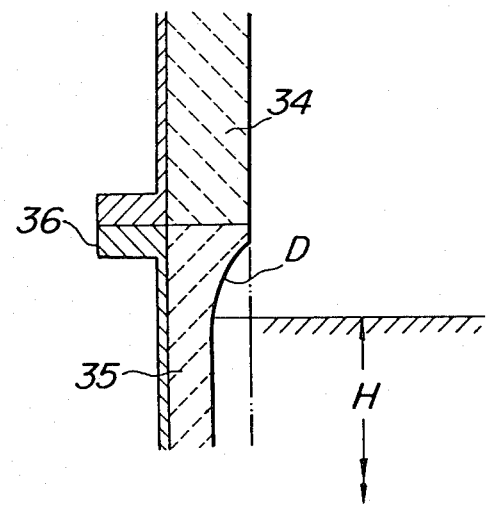
FIG_9

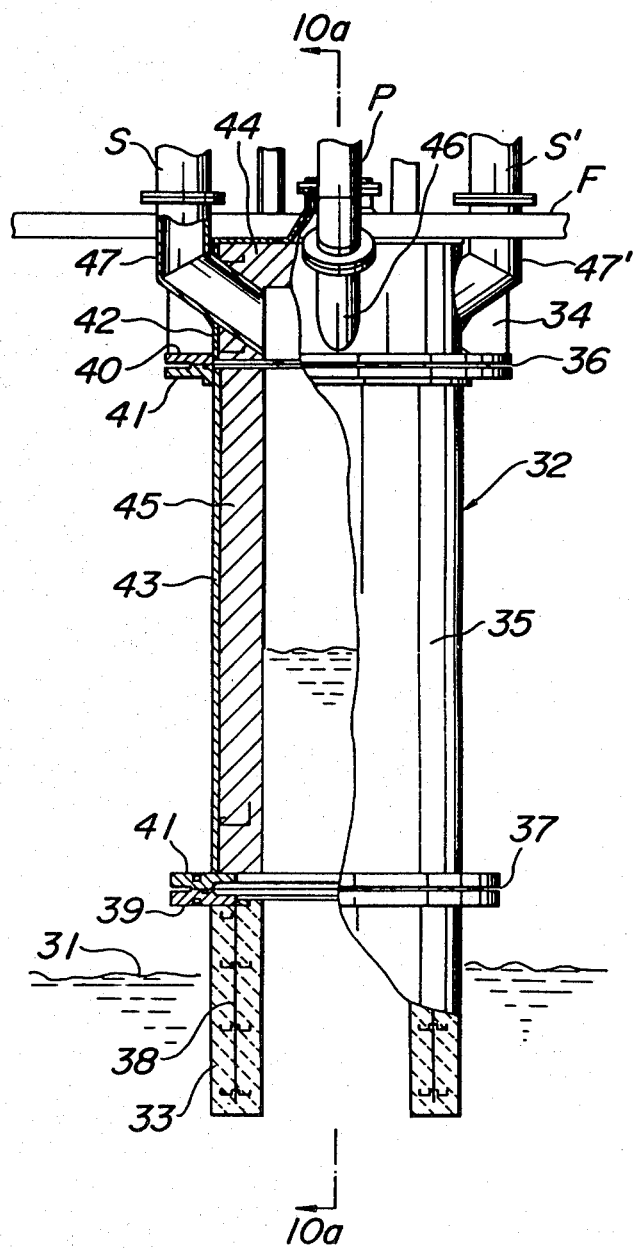

METHOD OF STIRRING MOLTEN METAL AND REFRACTORY CYLINDER FOR THE PURPOSE

BACKGROUND OF THE INVENTION

1. Field of the Invention

This invention relates to a method of stirring molten metal by repeatedly sucking and discharging part of the molten metal into and out of a refractory cylinder having an upper closed end and a lower opening end immersed in the molten metal, and more particularly to the refractory cylinder including evacuating and pressurizing means for carrying out the above method.

2. Description of the Prior Art

The inventors of the application have proposed a superior secondary refining method for molten steel carried out using an assembly shown in FIG. 1, wherein a lower end of a cylinder 6 made of a refractory material is immersed in a molten steel 5 in a ladle 1. The method comprises steps of evacuating the cylinder 6 to suck up an amount of the molten steel in the cylinder and pressurizing the cylinder to rapidly discharge the sucked molten steel into the ladle and periodically repeating the above operation to violently stir the molten metal in the ladle 1 with the aid of the kinetic energy transferred by the discharged molten steel. In this case, a deoxidizer or elements to be alloyed may be added into the cylinder. The added elements or the like melt into the molten steel in an inert atmosphere without any adverse effect of slag to ensure a high yield of the addition.

In order to obtain the kinetic energy for the effective stirring, the space on the meniscus of the melt in the cylinder is evacuated to raise the melt into the cylinder and then pressurized to rapidly discharging it into the ladle from the immersed end of the cylinder repeatedly at high cycles in unit time.

In actual operations on scale in the order of 300 ton, the refractory cylinder has usually 600–1,000 mm inner diameter and as much as 3,500 mm length and is provided at its upper end with pipings for pressurizing and evacuating and chutes for adding refining agents and/or elements to be alloyed.

Usually, cylindrical core metals are embedded in the immersed lower end of the cylinder for the purpose of shutting off air passing therethrough and reinforcing those areas and the upper areas thereabove are surrounded by protecting steel plates.

The larger the refractory cylinder, the greater is usually the stirring force, but the shorter is its service life. From results of experiments by the inventors, it has been found that the life of the refractory cylinder depends not only upon its size but also upon the amount of the molten steel to be treated in view of the stirring effect.

In raising and lowering the molten steel in the above manner, the inner surfaces of the refractory cylinder are necessarily damaged by the violent friction force between the moving molten metal column and the inner surfaces of the refractory cylinder at high temperatures. Also deposited solidified steel on the upper part of the inner surfaces due to splashes of the molten steel caused by the variation in pressure unavoidably lowers the performance of the apparatus.

A gas inlet usually opens into an axial direction of the refractory cylinder through a ceiling wall thereof for introducing the pressurized gas. In this case, the gas impinges directly against the uppermost surface of the raised molten metal column in the refractory cylinder so as to cause surges of the molten metal which also cause the splashes of the molten metal. Moreover, there is a tendency for the pressurized gas to be partially absorbed in the molten metal. In order to avoid adverse effect of the absorbed gas on the refining operation, a rare gas such as high purity argon is needed, which necessarily increases the refining cost because the inexpensive nitrogen gas cannot be used for this end.

As mentioned above, the splashes are caused by the surges of the molten metal which in turn limit the suction speed of the molten metal. On the other hand, higher pressure is needed for rapid discharge. However, there is a risk of violently blowing away the molten metal by the pressurized gas jetted from the immersed end into the molten metal in the event that the pressure is too high. To avoid this, if the pressure is maintained at a low value, the required stirring cannot be obtained.

By reducing the pressure to a value lower than the static pressure of the molten metal at the lower end of the refractory cylinder immediately before the surface of the pressurized molten metal in the refractory cylinder reaches the lower end thereof, the above blowing away of the molten metal may be avoided even for the rapid discharge under high pressurized pressure. However, the pressurizing period is in fact very short within at the most 0.4–0.5 sec during which the surface of the molten metal would reach the lower end thereof, so that the operation of measuring the pressure at that moment and stopping the pressurization or exhausting the pressure cannot be effected in time for the excess lowering of the surface of the molten metal because an operation of a valve takes about 0.2 sec. Up to the present, accordingly, it has been obliged to take means insufficient for stirring, such as lowest possible pressurizing speed or stable pressure range for avoiding the above precaution.

However, it is of course essential to discharge the raised molten metal in the refractory cylinder at a highest speed in order to obtain sufficient stirring energy. In this case, if the pressurizing stroke or period is delayed, the pressurizing effect will be preceded by the fall of the molten metal column due to its weight of gravity so as to decrease the accelerating effect of the pressurizing operation acting upon the molten metal column. In case of acceleration by gas pressure, the work done by the gas in expanding becomes inherently the accelerating energy, so that it is desirable for the gas pressure for pressurizing the molten metal to be as high as possible.

SUMMARY OF THE INVENTION

It is an object of the invention to provide a method of stirring molten metal to improve the refining effect to the maximum with the minimum use of refractory material.

It is another object of the invention to provide a method of stirring molten metal which eliminates the tendency for the pressurized gas to be absorbed into the molten metal which adversely affects the refining operation, and which further eliminates the surges and splashes of molten metal caused by the pressurized gas impinging directly against the uppermost surface of the raised molten metal column in the refractory cylinder.

To this end, according to the invention a pressurized gas is introduced into the refractory cylinder in an inclined direction relative to a vertical axis of the cylinder against a point on an opposite inner wall of the cylinder at least 500 mm above the maximum suction level of the molten metal in the cylinder. In this manner, the violent surges on the surface of the molten metal are suppressed to considerably decrease the absorbed gas in the metal, so that the sufficient refining effect can be obtained even if nitrogen or argon mixed with about 10% oxygen as an impurity is used.

It is a further object of the invention to provide a refractory cylinder which facilitate removing the deposited solidified metal due to splashes on the inside of the cylinder and enables cylinder parts to be exchanged during the service life of the refractory cylinder.

For this purpose, the refractory cylinder according to the invention comprises a flange connection at a location, preferably 100–1,000 mm higher than a predetermined maximum suction height of the molten metal in the cylinder.

It is still a further object of the invention to provide a refractory cylinder capable of maintaining its initial performance even if lower cylinder parts are exchanged many times by providing at an upper part of the cylinder a connecting port opening into an inside of the cylinder for a gas conduit for evacuating and pressurizing means and connecting ports for chutes for adding refining agents and/or elements to be alloyed.

It is another object of the invention to provide a refractory cylinder capable of easily removing the lower cylinder part which is likely to be damaged due to thermal attack on its inner and outer sides.

It is an additional object of the invention to provide a refractory cylinder capable of discharging the molten metal column from the cylinder at a sufficient speed to obtain effective stirring by providing a flow restricting opening having an inner diameter narrower than an inner diameter of the cylinder.

The invention will be more fully understood by referring to the following detailed specification and claims taken in connection with the appended drawings.

BRIEF DESCRIPTION OF THE DRAWINGS

FIG. 2 is a schematic sectional view of a refractory cylinder for explaining the invention;

FIG. 3 is a graph illustrating the relation between inner diameters of refractory cylinders and their lives;

FIG. 8 is a sectional view illustrating a refractory cylinder according to the invention showing connecting flanges in phantom lines;

FIG. 9 is a partial sectional view of a principal part of the refractory cylinder according to the invention;

FIG. 10a is a front view of an actual refractory cylinder, partially in section, of one embodiment of the invention;

FIG. 10b is a sectional view of the refractory cylinder taken along the line 10a—10a in FIG. 10a;

DETAILED DESCRIPTION OF THE PREFERRED EMBODIMENT

Figure 1:
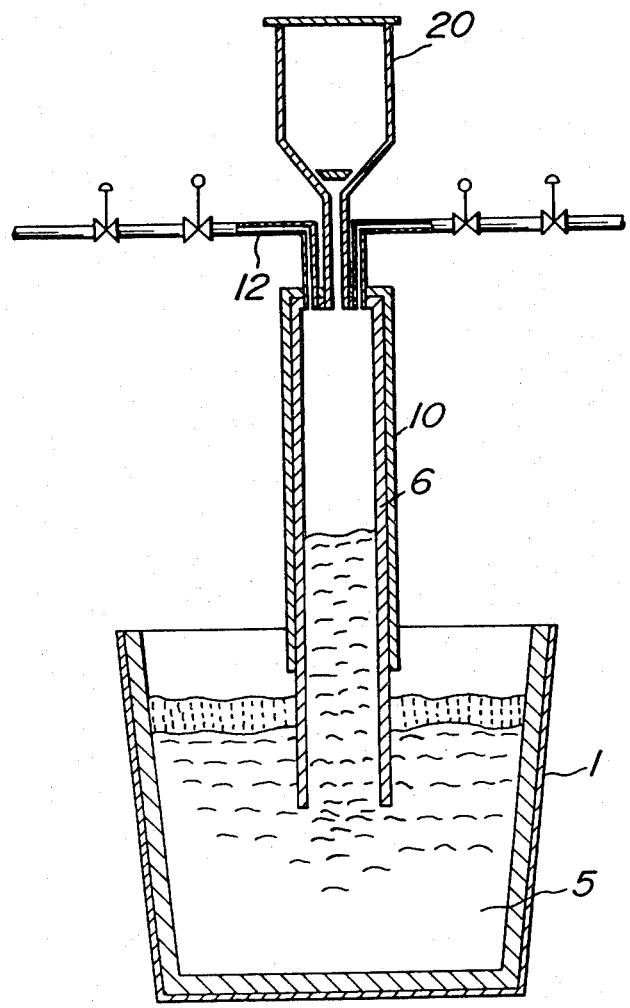
FIG. 1 is a sectional view of a refractory cylinder of the prior art.

FIG. 2 illustrates a refractory cylinder 22 in section whose lower end is immersed in a molten metal 21 of which part 23 is sucked in the refractory cylinder 22 by means of an evacuating and pressurizing system 24. The refractory cylinder 22 includes a cylindrical metal core 25 embedded in the lower portion 26 thereof for purpose of reinforcement. The cylindrical metal core 25 is provided at its upper end with a flange to which is connected a flange of an outer surrounding steel cylinder 27 forming the upper part of the refractory cylinder 22 to facilitate removing the immersed lower portion 26 considerably consumed for exchanging and repairing. An inner diameter of the refractory cylinder 22 is denoted by d and a depth of the immersed portion of the cylinder by h.

The lower portion 26 of the refractory cylinder 22 is reinforced by the cylindrical metal core 25 in the above manner. In this case, due to a difference in thermal expansion between the refractory material and metal core, cracks in the refractory will occur to shorten the life of the cylinder.

When the refractory cylinder 22 has a too large diameter, a moving distance of a slag layer lifting along the outer surface of the refractory cylinder is unduly long owing to a great amount of the sucked molten metal, to increase erosion of the outer surface and to shorten the life of the cylinder. Accordingly, it is preferable to make the refractory cylinder as small as possible to space apart the outer surface of the refractory cylinder at least more than 1 m from an inner surface of a ladle whose capacity is 25–200 t for a usual industrial scale.

FIG. 3 illustrates results of comparing test for the life with refractory cylinders having various inner diameters in consideration of sizes of ladles actually used. It is evident that the refractory cylinders having inner diameters less than 1,000 mm are superior in life to those having larger inner diameters.

As above described, it is preferable to have a smaller inner diameter of the refractory cylinder in view of the life of the refractory material. On the other hand, however, it is desired to treat the molten metal as much as possible in view of the stirring efficiency for the molten metal. Accordingly, the inventors of the application have further investigated the relation between the stirring effect and the inner diameter of the refractory cylinder.

Figure 4:
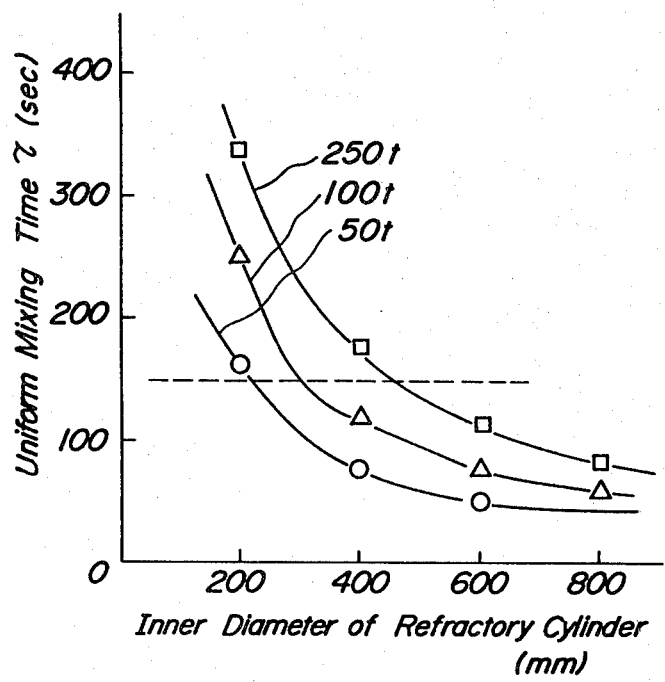
FIG. 4 is a graph illustrating the effect of the inner diameters of refractory cylinders on the time required for uniformly mixing molten metal.

Using ladles of three kinds for molten steel 50, 100 and 250 t, the stirring effect was studied for refractory cylinders having various inner diameters. The stirring effect was indicated by the time (referred to as "uniform mixing time $\tau$") required for uniformly melting and distributing aluminum added into molten steel during treating. The uniform mixing time was measured by adding aluminum of 50–100 kg into the molten metal treated by the stirring. The molten steel in the ladle was alternately sucked into and discharged out of the cylinder at gauge pressure of −600 mmHg to +200 mmHg in the cylinder with a period 5 sec of variation in pressure consisting of pressurizing period 0.5 sec and evacuating period 4.5 sec. The immersed depth h of the cylinders 22 was substantially constant 300–400 mm. The relation between the uniform mixing time and inner diameters of the cylinders is shown in FIG. 4.

The uniform mixing time less than 150 sec is preferable in view of floating and separation of inclusions and uniform distribution of elements to be alloyed for experimental facts for refining. Following relations between the inner diameters d (mm) and weights W (t) of molten metal to be treated are obtained from FIG. 4.

With W=50 t, d>215 mm
With W=100 t, d>300 mm
With W=250 t, d>470 mm

Figure 5:
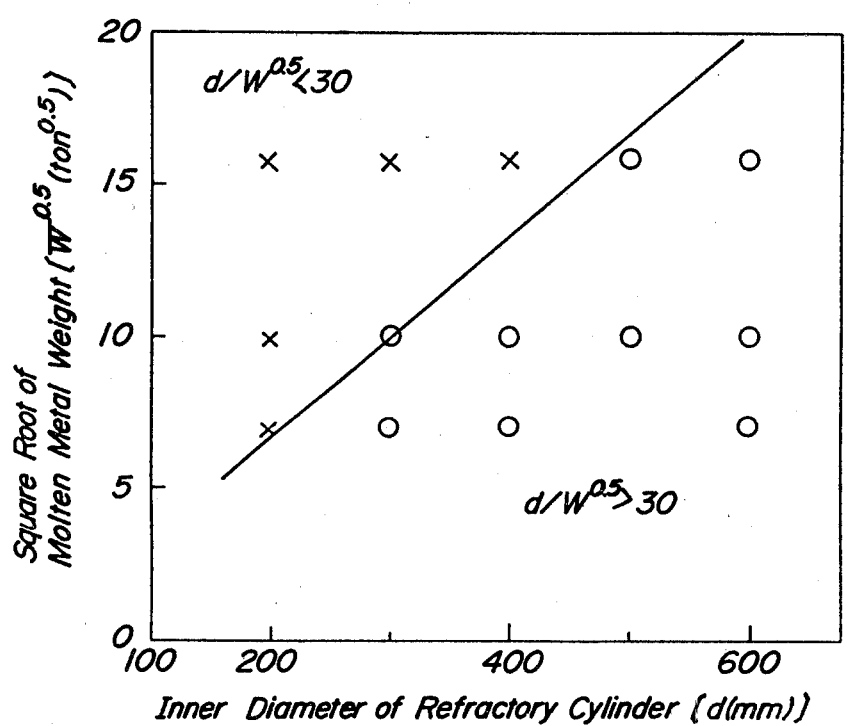
FIG. 5 is a graph showing the range of a relation between the inner diameters of the refractory cylinders and molten metal weight fulfilling the condition required for refining operation.

Square roots of the weights of the molten metal are plotted in relation to the inner diameters of the cylinders to obtain FIG. 5, wherein open marks illustrate cases fulfilling the condition of the uniform mixing time less than 150 sec and cross marks show cases not fulfilling the condition. From FIG. 5, it is clear that if the relation between the inner diameter d of the cylinder and weight W of molten metal is selected so as to fulfil the relation $d/W^{0.5} > 30$, the required stirring effect can easily be obtained.

Figure 6:
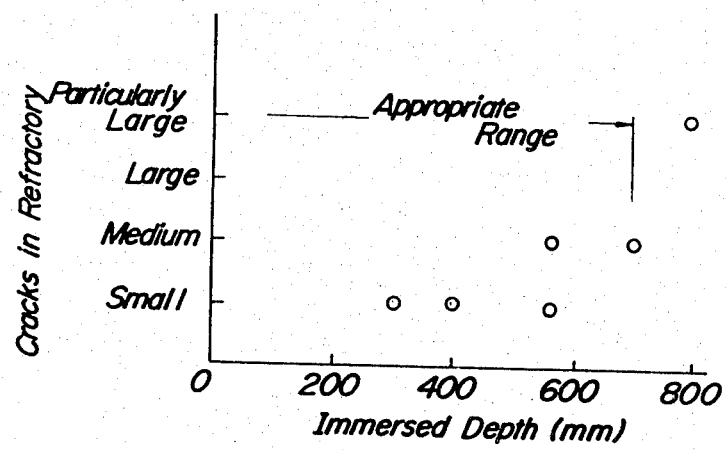
FIG. 6 is a graph illustrating the effect of the immersed depth of the refractory cylinder on cracks.

If the immersed depth h of the cylinder 22 is too deep, the refractory is apt to be damaged because the cylinder is subjected on inner and outer sides to more extensive heating to cause a larger deformation of the cylinder. The inventors inspected by their eyes the outer and inner surfaces of the cylinders after the treatment with the molten metal at 1,600°–1,610° C. for ten minutes of treating time. One result of the investigation of this relation is shown in FIG. 6, from which it is clear that with the immersed depth of more than 700 mm, the extent of cracks formed in the refractory walls is particularly large and with less than 700 mm, cracks substantially do not occur.

Figure 7:
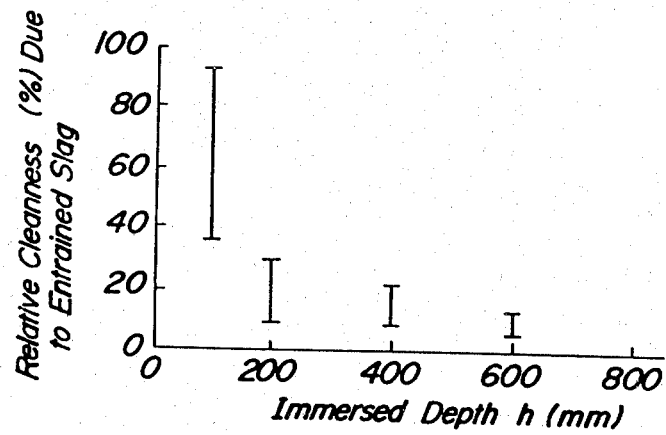
FIG. 7 is a graph showing the effect of the immersed depth of the refractory cylinder on inclusions in metal.

If the immersed depth of the cylinder is too shallow, there is a tendency for the slag to be entrained into the molten metal. Referring to FIG. 7, when the immersed depth of the cylinder is less than 200 mm, the violent jet or discharge of molten metal into the ladle tends to entrain the slag (particularly iron oxide containing slag) thereinto to make the oxygen [O] in the molten metal higher.

As mentioned above, the cylinder is required to suppress cracks in refractory material to prevent it from becoming brittle because of the severe condition due to flowing of high temperature molten metal at high speed over and over again. According to the invention, the stirring refining for metals can be effectively carried out in a systematic manner for production.

FIG. 8 illustrates a preferred embodiment of the invention by phantom lines applied to a conventional cylinder 32 having a lower end 33 immersed in a molten metal 31 in a refining vessel, for example, a ladle. An upper cylinder part 34 and an intermediate cylinder part 35 of the cylinder 32 are provided with a flange connection 36 to meet the object of the invention and the intermediate cylinder part 35 and the lower cylinder part 33 are provided with a flange connection 37 according to the preferred embodiment.

The immersed depth h about 0.5 m of the refractory cylinder and the sucked height H approximately 1.2 m of the molten metal in the cylinder are needed for effectively stirring and refining the molten metal according to the inventor's testing operation. Under such operating condition, they have found that the deposit of the molten metal due to the splashes thereof extends over a zone "A", 100–1,000 mm over the maximum suction height H and a zone "B" of an underside of a ceiling wall of the cylinder, which are shaded in FIG. 8. On the other hand, the damage "D" of the inner surface of the refractory cylinder due to melting extends to the level 100 mm over the maximum suction height H as shown in FIG. 9.

In order to facilitate the removal of the deposit on the inside of the refractory cylinder, according to the invention the flange connection 36 is provided at a location 100–1,000 mm above the maximum suction height H, thereby facilitating cleaning or clearing the inside of the upper cylinder part 34 of the cylinder after removal thereof. As the upper cylinder part 34 is not subjected to the attack by melting as shown in FIG. 9, it is sufficient to exchange only the intermediate and lower cylinder parts 35 and 33 to subsequently use the cylinder. Moreover, the second flange connection 37 is effective for exchanging the lower cylinder part 33 which is always immersed in the molten metal and subject to erosion.

Figure 10B:
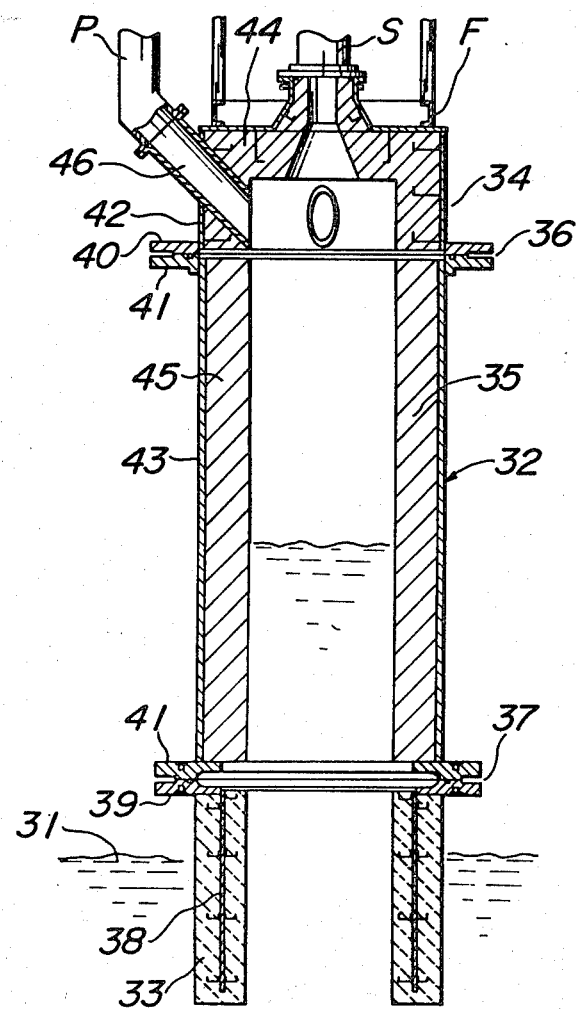

FIGS. 10a and 10b illustrate a concrete example of the refractory cylinder 32 according to the invention. In this embodiment, a lower cylinder part 33 is made of a castable refractory in the form of a cylinder which includes a reinforcement 38 embedded therein and at its upper end an annular flange 39 integrally fixed thereto. Steel cylinders 42 and 43 are provided at the former's lower end and the latter's upper and lower ends with annular flanges 40 and 41 and are lined with refractory bricks 44 and 45 to form an upper and an intermediate cylinder part 44 and 45.

It is preferable to provide baffles (not shown) below the openings of the inside of the upper cylinder 34 to prevent depositing of splashes.

The flange connection 36 consisting of the annular flanges 40 and 41 is at a location 900 mm about the predetermined maximum suction height of the molten metal in the refractory cylinder 32 and the second flange connection 37 consisting of the annular flanges 39 and 41 is at a location 900 mm from the lower end of the lower cylinder part 33.

The upper cylinder part 44 is closed at its upper end by an upper refractory wall and is provided with a connecting port 46 opening into the upper cylinder part for a gas conduit P for evacuating and pressurizing operation and connecting ports 47 and 47' for chutes S and S' for adding refining agents and/or elements to be alloyed. The upper cylinder part 44 is further provided with a support plate F fixed thereto for the gas conduit P and operating equipment for the chutes S and S'.

In practical operation using the above refractory cylinders, in the event that only lower cylinder parts were detachable, they were exchanged after use of about forty times and whole the refractory cylinders could be used about ninety times. With the refractory cylinders according to the invention, the intermediate cylinder parts were exchanged after use of ninety-three times, and whole the refractory cylinders could be used more than two hundred times, so that the refractory material could be saved as much as 30% of the material hitherto required.

According to the invention, as above mentioned, the part of the refractory cylinder apt to be damaged due to violent lifting movement of the molten metal is easily exchanged or repaired to improve the life of the whole refractory cylinder resulting into saving of the refractory material used. Moreover, the refractory cylinder can be easily recovered from the functional disorder due to deposition of splashes of the molten metal.

Figure 11:
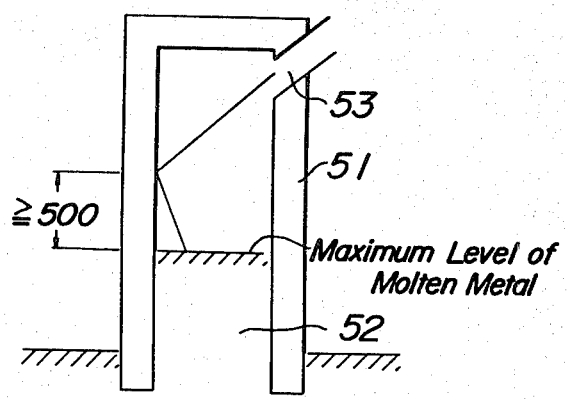
FIG. 11 is a schematic sectional view of a refractory cylinder of another embodiment of the invention.

Referring to FIG. 11 illustrating a refractory cylinder 51 including molten metal 52 sucked to the maximum level, the refractory cylinder is provided with an inlet 53 for expelling or discharging the molten metal out of the cylinder, which is inclined at 45° to a vertical axis of the cylinder. The inventors carried out the stirring refining of the steel with nitrogen gas by the use of the refractory cylinder shown in FIG. 11, observing through a sight glass the action of the introduced pressurized gas. It has been found in the observation that the surges on the surface of the molten metal are effectively suppressed and the value [N] in metal which increased to the order of 5 ppm in the prior art substantially does not increase and even decreases in some cases.

With this refractory cylinder, an extension of a central axis of the inlet 53 intersects the opposite inner wall of the cylinder at a point 700 mm above the maximum molten metal level and the increase of the value [N] is between $-5$ ppm and $-2$ ppm. The same effect is obtained even the above intersecting point is lowered to 500 mm above the maximum molten metal level.

Figure 12:
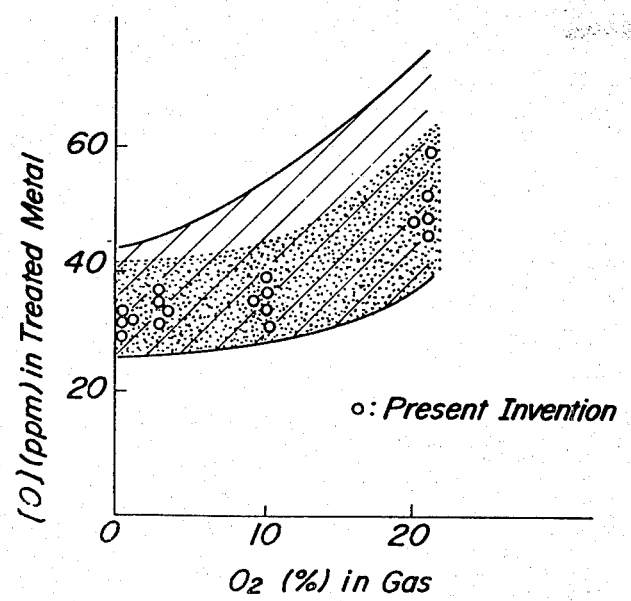
FIG. 12 is a graph showing the effect of $O_2$ in pressurized gas on [O] (ppm) picked up in steel.

The inventors further carried out the operation with pressurized nitrogen gases ($N_2$) including various amounts of oxygen gas ($O_2$), the results being shown in FIG. 12 whose hatched area shows the range of [O] in the prior art. Open marks illustrate the results according to the invention, which are within the finely shaded range. From FIG. 12, it is clear that the extremely high value of [O] can be avoided and that even the pressurized gas including up to 10% oxygen can be practically used for the purpose without practical trouble. In this manner, the pressurized gas including impurities can be effectively used for stirring refining according to the invention, so long as the oxygen gas ($O_2$) included in the pressurized gas is less than 10%.

As above mentioned, the refractory cylinder according to the invention solves the problem of gas absorption in the metal and remarkably reduces the cost of the pressurized gas, so that the effective stirring refining can be performed without practical risk of excess gas absorption.

The inventors further carried out the experiment with respect to the pressurizing and evacuating condition to develop a further preferable embodiment of the invention which lies in the following discovery.

1. When the lower opening of the refractory cylinder is narrowed, the amount of the molten metal passing therethrough for a unit time is reduced to increase the time required to discharge the molten metal out of the cylinder.

2. Even if the pressure for discharging the molten metal out of the cylinder is higher, the time required to discharge the molten metal cannot be considerably shortened.

3. Increased pressure for discharging the molten metal can bring about high speed jet of the molten metal to increase the stirring energy.

4. If the stirring energy is sufficient, it is not necessarily required to discharge all the sucked molten metal. Accordingly, part of the molten metal can remain at the lower opening of the cylinder.

5. In this manner, the lowering speed of the molten metal toward the lower end of the cylinder is lower, so that the surges and hence splashes of the molten metal due to the rapid lowering of the molten metal in the refractory cylinder can be prevented.

6. Moreover, the low lowering speed of the molten metal can prevent the gas blowing away at the lower end of the cylinder due to the delay of changing the pressurizing period to the evacuating period.

Based on the discovery, the inventors have found that when the refractory cylinder is provided at its lower end with a flow restricting opening having a diameter $d_1$ and a length $l_1$, if $l_1/l_2 > 0.2$ and $d_1/d_2 = 0.5$–$0.96$ are fulfilled with regard to the maximum sucked height $l_2$ of the molten metal above the flow restricting opening and the inner diameter $d_2$ of the refractory cylinder, the aimed object of the invention can be appropriately realized.

Figure 13:
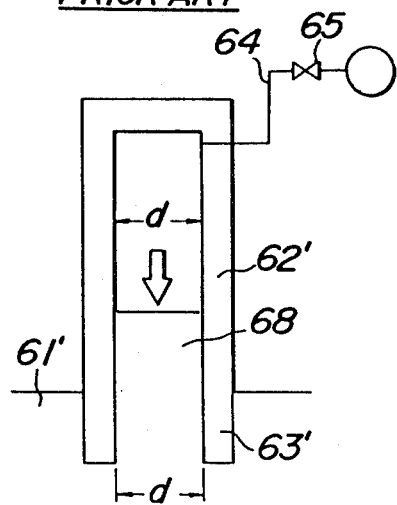
FIG. 13 is a schematic sectional view of a refractory cylinder of the prior art for explaining a further embodiment of the invention.
Figure 14:
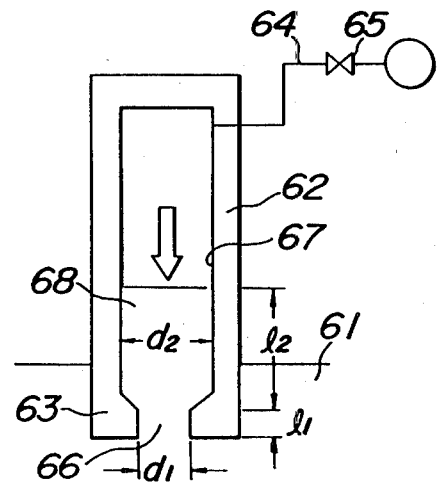
FIG. 14 is a schematic sectional view of a refractory cylinder of a further embodiment of the invention.

FIG. 13 schematically illustrates a refractory cylinder of the prior art for helping understanding a further embodiment of the invention shown in FIG. 14. In these drawings, the refractory cylinder 62, 62' has a submerged or immersed end 63, 63' in molten metal 61, 61' in a ladle (not shown) and is provided with a piping 64 for evacuating and pressurizing the cylinder including a regulating valve 65.

As shown in FIG. 14, according to the invention the refractory cylinder 62 is provided at its immersed end 63 over a distance $l_1$ with a flow restricting opening 66 having an inner diameter $d_1$ narrower than an inner diameter $d$ of the cylinder 62' in FIG. 13. A main cylinder part 67 of the refractory cylinder 62 adjacent to the flow restricting opening 66 has over a distance $l_2$ of the maximum molten metal suction height an inner diameter $d_2$ substantially equal to the inner diameter $d$ of the cylinder 62' in FIG. 13.

Figure 15:
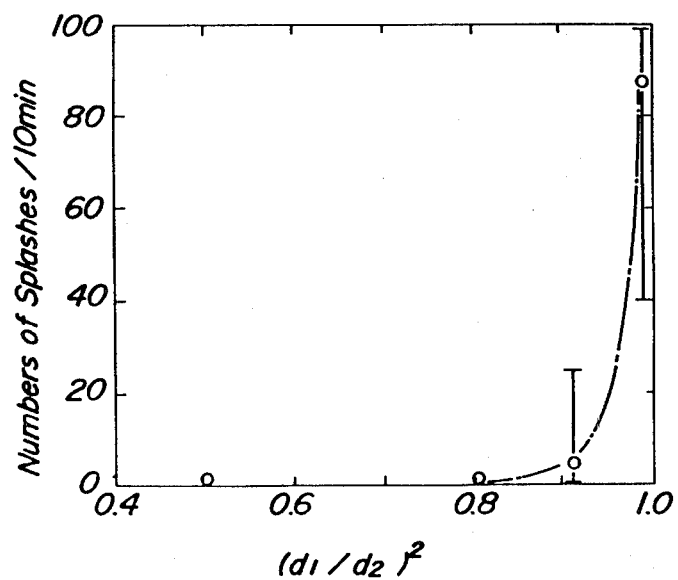
FIG. 15 is a graph illustrating the effect of $(d_1/d_2)^2$ in FIG. 14 on splashes of molten metal.

FIG. 15 illustrates the result of the investigation for studying the effect of area ratio $(d_1/d_2)^2$ on the splashes of molten metal. The experiment was effected with aluminum killed steel under conditions of 10–12 minutes of treating time, at the maximum pressure 250 mmHg, the minimum pressure $-600$ mmHg and the period of 6 sec for evacuating and pressurizing. Numbers of the splashes are plotted in an ordinate in FIG. 15, which reaches an inspection window secured in an air-tight manner to a ceiling wall of the refractory cylinder and were counted in ten minutes in the operation.

As can be seen from FIG. 15, the splashes are suppressed by determining the ratio within the range $d_1/d_2 \lesssim 0.92^{0.5} \simeq 0.96$ to an extent more than that obtained by limiting the lifting speed of the molten metal in the refractory cylinder. The diameter $d_1$ only slightly smaller than $d_2$ can bring about the significant effect, for which reason will be explained hereinafter.

The smaller the inner diameter $d_1$ of the flow restricting opening 66, the lowering speed $U_L$ of the molten metal in the cylinder becomes lower. If the discharging speed of the molten metal through the flow restricting opening 66 which is indicated by $U_N = U_L \times (d_2/d_1)^2$ is kept substantially the same as in the case of the cylinder 62' in FIG. 13, the lowering speed $U_L$ of the molten metal surface can be maintained at a lower value which is $U_N \times (d_1/d_2)^2$ and within a range preventing the splashes. If the inner diameter $d_1$ of the flow restricting opening 66 is too small, the rising speed of the molten metal in the suction stroke becomes too high at the flow restricting opening, so that gaseous elements contained in the molten metal form bubbles depending upon the existing vacuum degree to cause the splashes of the molten metal and the rising of the molten metal is delayed so as to consume the time required for the suction stroke to reduce the number of operation in a limited period of time for treating the metal.

According to the result of the inventor's experiments in connection therewith, with the refractory cylinder of the prior art shown in FIG. 13, the splashes could be almost prevented by providing more than 2.5 sec for the evacuating or suction stroke or at evacuating speed less than 500 mmHg/sec. When such an evacuating speed is selected for the refractory cylinder according to the invention shown in FIG. 14, the molten metal column 68 reaches a predetermined level in a period of time which is $(d_2/d_1)^2$ times larger than the time for the cylinder shown in FIG. 13.

In general, the time for treating the molten metal should be within 15 minutes in consideration of the refining capacity, for example, productivity and temperature drop of the molten metal. During such a short time, the sufficient deoxidation refining should be carried out, so that the time for the evacuating or suction strokes must be shorter than 10 sec. Accordingly, in order that the time $2.5 \times (d_2/d_1)^2$ for the vacuumizing stroke for preventing the splashes of the molten metal in the cylinder in FIG. 14 is shorter than 10 sec, $(d_2/d_1)^2 < 4$ or $d_1/d_2 > 0.5$ is essential for the invention. It has been found that too small inner diameters $d_1$ cause considerable damage to the refractory of the cylinder.

Then, if the length $l_1$ of the flow restricting opening 66 is too short, violent turbulences of the molten metal are caused in the flow of the metal sucked and discharged through the opening to damage the refractory considerably. According to the results of the experiment with models, it has been found that in relation between the length $l_1$ of the flow restricting opening and the height $l_2$ of the molten metal adjacent to and above the opening, the relation $l_1/L_2 > 0.2$, more preferably $l_1/l_2 \gtrsim 0.3$ can eliminate the violent turbulences. The opening 66 is preferably tapered downward and it is preferable to avoid a sharp edge or shoulder.

As is clear from the above description, the term "flow restricting opening" used herein is intended to mean such an opening at an immersed lower end of a refractory cylinder mentioned at the beginning of the specification and narrowed in diameter less than that of the cylinder.

EXAMPLE

Using a refractory cylinder having an inner diameter 600 mm and a flow restricting opening having a length 300 mm and an inner diameter 360 mm, the stirring of molten metal by suction and discharge was carried out by repeatedly pressurizing and evacuating with a period of 8 sec at pressures between the maximum pressurizing of 400 mmHg and minimum evacuating of $-550$ mmHg in gauge pressure.

The molten metal was sufficiently strongly stirred without any risk of jetting gases from the lower end of the cylinder. According to an observation after the treatment, the deposit of the metal on the inside of the cylinder due to splashes was negligible.

COMPARATIVE TEST 1

With a refractory cylinder having an inner diameter 600 mm without any flow restricting opening, the stirring was carried out under the same condition as above. Although the maximum gauge pressure in pressurizing stroke was limited to 330 mmHg, gases jetted from the lower end of the cylinder at the limited pressure to blow away the molten metal.

COMPARATIVE TEST 2

The stirring was carried out under the condition similar to that of the comparative test 1 with exception of the maximum gauge pressure 100 mmHg in pressurizing strokes. In order to obtain sufficient stirring effect under this condition, the time for pressurizing was 0.28 sec. After the treatment, the inside of the refractory cylinder was covered with deposit of metal of about 20 mm thickness.

As can be seen from the above application, the stirring refining for metals can be effectively carried out in a systematic manner for production according to the invention. Moreover, the part of the refractory cylinder apt to be damaged due to violent lifting movement of the molten metal is easily exchanged or repaired to improve the life of the whole refractory cylinder resulting into saving of the refractory material used. Furthermore, the refractory cylinder can be easily recovered from the functional disorder due to deposition of splashes of the molten metal.

According to the invention, moreover, the refractory cylinder solves the problem of gas absorption in the metal and remarkably reduces the cost of the pressurized gas, so that the effective stirring refining can be performed without practical risk of excess gas absorption. The refractory cylinder according to the invention sufficiently strongly stirred without any risk of jetting gases from the lower end of the cylinder and without deposition of the metal on the inside of the cylinder due to splashes.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of stirring molten metal by repeated sucking and rapidly discharging part of said molten metal into and out of a refractory cylinder having a lower opening end immersed in said molten in a ladle, comprising operating the stirring under a condition wherein an inner diameter (d) of said refractory cylinder is less than 1,000 mm, a relation between the inner diameter (d, mm) of said refractory cylinder and weight (W, ton) of said molten metal in said ladle is $d/W^{0.5} > 30$, and an immersed depth of said refractory cylinder is within 200–700 mm.

2. A method of stirring molten metal as set forth in claim 1, wherein for the rapid discharge of the molten metal from the refractory cylinder a pressurized gas is introduced into said refractory cylinder in an inclined direction relative to a vertical axis of the refractory cylinder against a point on an opposite inner wall of the cylinder at least 500 mm above a maximum suction level of the molten metal in the cylinder.

3. A method of stirring molten metal as set forth in claim 2, wherein said pressurized gas is at least one inert gas such as argon, nitrogen and the like, including oxygen less than 10%.

4. A refractory cylinder for stirring molten metal having a lower opening end immersed in said molten metal in a ladle and including evacuating and pressurizing means for repeatedly sucking and discharging rapidly part of said molten metal into and out of said refractory cylinder, comprising a flange connection for said refractory cylinder at a location higher than a predetermined maximum suction height of said molten metal in the cylinder.

5. A refractory cylinder as set forth in claim 4, wherein said location of the flange connection is 100–1,000 mm above said maximum suction height.

6. A refractory cylinder as set forth in claim 4, wherein said refractory cylinder comprises above said flange connection a connecting port opening into an inside of said refractory cylinder for a gas conduit for said evacuating and pressurizing means.

7. A refractory cylinder as set forth in claim 4, wherein said refractory cylinder further comprises, above said flange connection, connecting ports for chutes for adding refining agents and/or elements to be alloyed.

8. A refractory cylinder as set forth in claim 4, wherein said refractory cylinder further comprises a flange connection on a side of its lower end immersed in said molten metal for detaching the immersed end from the refractory cylinder.

9. A refractory cylinder as set forth in claim 4, wherein said refractory cylinder is provided at its immersed end with a flow restricting opening having a diameter $d_1$ and a length $l_1$ in an axis of the cylinder formed by narrowing an opening of the lower opening end such that following relations are fulfilled with respect to a height $l_2$ of said sucked molten metal above said flow restricting opening and an inner diameter $d_2$ of the refractory cylinder: $l_1/L_2 > 0.2$ and $d_1/d_2 = 0.5-0.96$.

* * * * *